(12) United States Patent (10) Patent No.: US 12,058,593 B2
Yun et al. (45) Date of Patent: Aug. 6, 2024

(54) DRIVING NEGOTIATION METHOD AND APPARATUS

(71) Applicants: Penta Security Inc., Seoul (KR); Autocrypt Co., Ltd., Seoul (KR)

(72) Inventors: Keon Yun, Seoul (KR); Myung Woo Chung, Seoul (KR); Sang Gyoo Sim, Seoul (KR); Duk Soo Kim, Seoul (KR); Seok Woo Lee, Seoul (KR)

(73) Assignees: Penta Security Inc., Seoul (KR); Autocrypt Co., Ltd., Seoul (KR)

( * ) Notice: Subject to any disclaimer, the term of this patent is extended or adjusted under 35 U.S.C. 154(b) by 326 days.

(21) Appl. No.: 17/537,032

(22) Filed: Nov. 29, 2021

(65) Prior Publication Data

US 2023/0143929 A1 May 11, 2023

(30) Foreign Application Priority Data

Nov. 10, 2021 (KR) .......................... 10-2021-0153809

(51) Int. Cl.
  *H04W 4/46* (2018.01)
  *G01C 21/36* (2006.01)
  *G08G 1/09* (2006.01)
(52) U.S. Cl.
  CPC .............. *H04W 4/46* (2018.02); *G08G 1/091* (2013.01); *G01C 21/3691* (2013.01)
(58) Field of Classification Search
  CPC .......... H04W 4/46; H04W 4/44; G08G 1/091; G08G 1/092; G08G 1/096725;
  (Continued)

(56) References Cited

U.S. PATENT DOCUMENTS

2017/0084174 A1 3/2017 Suzuki
2020/0045552 A1* 2/2020 Kim ................... H04W 12/069
(Continued)

FOREIGN PATENT DOCUMENTS

EP 3859709 A1 4/2021
JP 2009-211397 A 9/2009
(Continued)

OTHER PUBLICATIONS

Extended European Search Report for EP21211209.8 by European Patent Office dated May 20, 2022.

*Primary Examiner* — Rodney A Butler
(74) *Attorney, Agent, or Firm* — BROADVIEW IP LAW, PC

(57) ABSTRACT

Provided are a driving negotiation method and apparatus for supporting stability against a blind spot, an unexpected situation, etc. and a rapid judgment and response of an autonomous vehicle in various driving environments. The driving negotiation apparatus includes a wireless communication module configured to support vehicle to everything (V2X) communication and at least one processor connected to the wireless communication module. The at least one processor receives a cooperative request message from a first vehicle, broadcasts a cooperative request message and additional information required for a negotiation to surrounding vehicles, receives a cooperative response message from at least one second vehicle among the surrounding vehicles, and transmits a message indicating that the negotiation is possible or impossible to the first vehicle on the basis of the cooperative response message.

17 Claims, 10 Drawing Sheets

(58) Field of Classification Search
CPC ....... G08G 1/096758; G08G 1/096783; G08G 1/096791; G08G 1/163; G08G 1/164; G01C 21/3691
See application file for complete search history.

(56) References Cited

U.S. PATENT DOCUMENTS

| | | | |
|---|---|---|---|
| 2020/0342760 A1 | 10/2020 | Vassilovski et al. | |
| 2021/0345296 A1* | 11/2021 | Yang | H04W 72/02 |
| 2022/0244743 A1* | 8/2022 | Ganlath | G05D 1/0295 |
| 2022/0332350 A1* | 10/2022 | Jha | B60W 60/0017 |

FOREIGN PATENT DOCUMENTS

| | | |
|---|---|---|
| JP | 2016-1432 A | 1/2016 |
| WO | 2021/092039 A1 | 5/2021 |

* cited by examiner

DRIVING NEGOTIATION METHOD AND APPARATUS

CROSS-REFERENCE TO RELATED APPLICATION(S)

This application claims priority to Korean Patent Application No. 2021-0153809 filed on Nov. 10, 2021 in the Korean Intellectual Property Office (KIPO), the entire contents of which are hereby incorporated by reference.

BACKGROUND

1. Technical Field

Example embodiments of the present invention relate, in general, to a driving negotiation method for stability in vehicle driving and, more specifically, to a driving negotiation method and apparatus for supporting stability against a blind spot, an unexpected situation, etc. and rapid judgment and response of an autonomous vehicle in various driving environments.

2. Related Art

A cooperative intelligent transportation system (C-ITS) is not an ITS that is centered on traffic management by providing information from traffic infrastructure to vehicles in one way but a next generation ITS in which data is continuously shared in two ways among vehicles and between vehicles and infrastructure such that unexpected situations may be handled and prevented in advance.

With regard to next generation ITS, active research is underway to introduce a connected vehicle. The connected vehicle is obtained by providing connectivity to an existing vehicle, which travels in a stand-alone manner, on the basis of vehicle to everything (V2X) communication. Such a connected vehicle is aimed at acquiring information on traffic flow, accidents. etc. through two-way communication, such as vehicle to infrastructure (V2I), vehicle to network (V2N), vehicle to vehicle (V2V), vehicle to nomadic devices (V2ND), vehicle to pedestrian (V2P), or V2X communication, and providing or using various services such as safe driving and prevention of traffic jam.

Since the early 2000 s, vehicle communication for vehicle safety has been researched as dedicated short-range communication (DSRC) which is the extension of technology based on Institute of Electrical and Electronics Engineers (IEEE) 802.11, also known as wireless access for vehicle environment (WAVE), is standardized as IEEE 802.11p. After the beginning of 2015, the standardization of vehicle communication employing Long Term Evolution (LTE) technology, which is a mobile communication network technology, began in earnest. The Third Generation Partnership Project (3GPP), which is an international mobile communication standardization organization, completed standardization for LTE vehicle communication on March 2017, such as reducing delay time with the LTE technology and supporting V2V communication, to lay the foundation for the proliferation of vehicle communication. After that, discussion has been ongoing for performance improvement and fusion with the fifth generation (5G) (new radio (NR)) communication technology.

Currently, there are limits to stability and response to blind spots or unexpected situations on the road only with the sensors of autonomous vehicles. In particular, when various driving situations occur at uncontrolled intersections, roundabouts, merging roads, etc., there are still limits to the speedy judgment and resultant stability of autonomous vehicles.

To ensure the stability of a vehicle driving in an environment in which vehicles without any communication function, autonomous vehicles, etc. coexist, it is necessary to define driving negotiation scenarios for lane change requests, merging plan sharing, etc. and an appropriate message set for the driving negotiation scenarios. Further, a driving negotiation process based on the communication between a road-side unit (RSU) and a vehicle is required to share a driving negotiation strategy.

SUMMARY

Accordingly, example embodiments of the present invention are provided to substantially obviate one or more problems due to limitations and disadvantages of the related art.

Example embodiments of the present invention provide a driving negotiation method and apparatus that may improve the driving stability of a vehicle, such as an autonomous vehicle, by providing the definitions of a message set and a negotiation process for driving negotiations based on vehicle to infrastructure (V2I) communication in a next-generation intelligent transport system or cooperative intelligent transport system (C-ITS) environment in which real-time information sharing is possible among electronic devices, particularly, vehicles and objects.

Example embodiments of the present invention also provide a driving negotiation method and apparatus that allow infrastructure devices, such as road-side units (RSUs), to effectively support driving negotiation strategies in a road environment in which vehicles without any communication function, autonomous vehicles, etc. coexist.

Example embodiments of the present invention also provide a driving negotiation method and apparatus that allow a vehicle to effectively ensure the stability of vehicle driving by actively sharing a driving negotiation strategy in a C-ITS environment.

In some example embodiments, a driving negotiation apparatus includes a wireless communication module configured to support vehicle to everything (V2X) communication and at least one processor connected to the wireless communication module. The at least one processor receives a cooperative request message CooperativeRequestMsg from a first vehicle, generates and broadcasts a cooperative relay message obtained by adding a type code of additional information required for a negotiation to the cooperative request message to surrounding vehicles, receives a cooperative response message CooperativeResponseMsg corresponding to the cooperative relay message from at least one second vehicle among the surrounding vehicles, and transmits a message indicating that the negotiation is possible or impossible to the first vehicle on the basis of the cooperative response message.

The wireless communication module may be installed at an RSU or road-side equipment (RSE).

The additional information may include information related to vehicle speed change, lane change, lane joining, collision warning, collision avoidance, intersection warning, road condition warning for icing and the like, overpass warning, or toll collection.

The at least one processor may generate a relevant message associated with a message type of a negotiation request message before broadcasting the cooperative relay message to the surrounding vehicles. When broadcasting the cooperative relay message, the at least one processor may broadcast the relevant message together with the cooperative relay message.

After transmitting a negotiation response message or the message indicating that the negotiation is possible or impossible to the first vehicle, the at least one processor may receive a message for renegotiation including an identification value of a current driving negotiation session as an identification value of a previous driving negotiation session or another cooperative request message from the first vehicle.

In other example embodiments, a driving negotiation method includes receiving a cooperative request message CooperativeRequestMsg from a first vehicle, generating and broadcasting a cooperative relay message obtained by adding a type code of additional information required for a negotiation to the cooperative request message to surrounding vehicles, receiving a cooperative response message CooperativeResponseMsg corresponding to the cooperative relay message from at least one second vehicle among the surrounding vehicles, and transmitting a message indicating that the negotiation is possible or impossible to the first vehicle on the basis of the cooperative response message.

The cooperative request message or cooperative response message may include data frames (DFs) about vehicle speed, lane changes, and lane joining. A first DF about the vehicle speed may be negotiation message information about a speed adjustment plan and may include first data elements (DEs) about overtaking, deceleration, and stopping. A second DF about the vehicle speed may be negotiation message information about a lane change plan and may include second DEs about avoidance, accidents, cut-ins, and pedestrians. A third DF about the lane joining may be a negotiation message about a lane change plan and may include third DEs about merging roads, intersections, and roundabouts.

The cooperative request message or the cooperative response message may include DEs about a timestamp, a vehicle identifier (ID) (or a temporary ID), a message ID (UniqueMSG_ID, messageid, or MsgID), a previous message ID (previousmessageid or preMsgID), and message information (infoMsg).

The message ID which is the DE of the cooperative request message may be the identification value of the current driving cooperation session and may be used in defining a process from driving negotiation request to response.

The message information which is the DE of the cooperative request message may include a message list or a message type sequence (SequenceofMessageType) required for negotiation information and may be received in a null state from the first vehicle during an initial driving negotiation.

The driving negotiation method may further include generating a relevant message associated with a message type of a negotiation request message before the broadcasting of the cooperative relay message to the surrounding vehicles. The broadcasting of the cooperative relay message may include broadcasting the relevant message together with the cooperative relay message.

When the message type of the cooperative request message is lane joining, a processor may generate an intersection collision alert (ICA) message as the cooperative relay message. Also, the processor may include a preset type code of ICA in the message information. The message type code may correspond to a message ID, for example, DE_DSRC_MessageID, defined in documents such as Society of Automotive Engineers (SAE) J2735.

The cooperative response message may include a data field about a response type including a response value for a negotiation of the second vehicle and information required for the negotiation and may include DEs about a message ID and a previous message ID of the first vehicle.

The response value for the negotiation may include DEs about agreement or refusal.

The message indicating that the negotiation is possible or impossible may be transmitted to the first vehicle in a broadcasting form.

The driving negotiation method may further include ending a current driving negotiation session when a cooperative response message from each of the at least one second vehicle includes DEs indicating that the negotiation is impossible.

The driving negotiation method may further include, after the transmitting of the message indicating that the negotiation is possible or impossible to the first vehicle, receiving a message for renegotiation including an identification value of a current driving negotiation session as an identification value of a previous driving negotiation session or another cooperative request message (a second cooperative request message) from the first vehicle.

The driving negotiation method may further include, when the second cooperative request message is received from the first vehicle, determining whether a currently requested driving negotiation session is a renegotiation for the previous driving negotiation session on the basis of the message information.

The driving negotiation method may further include, when two or more second cooperative request messages compete, selecting another cooperative request message in a preset order of priority.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

Figure 1:
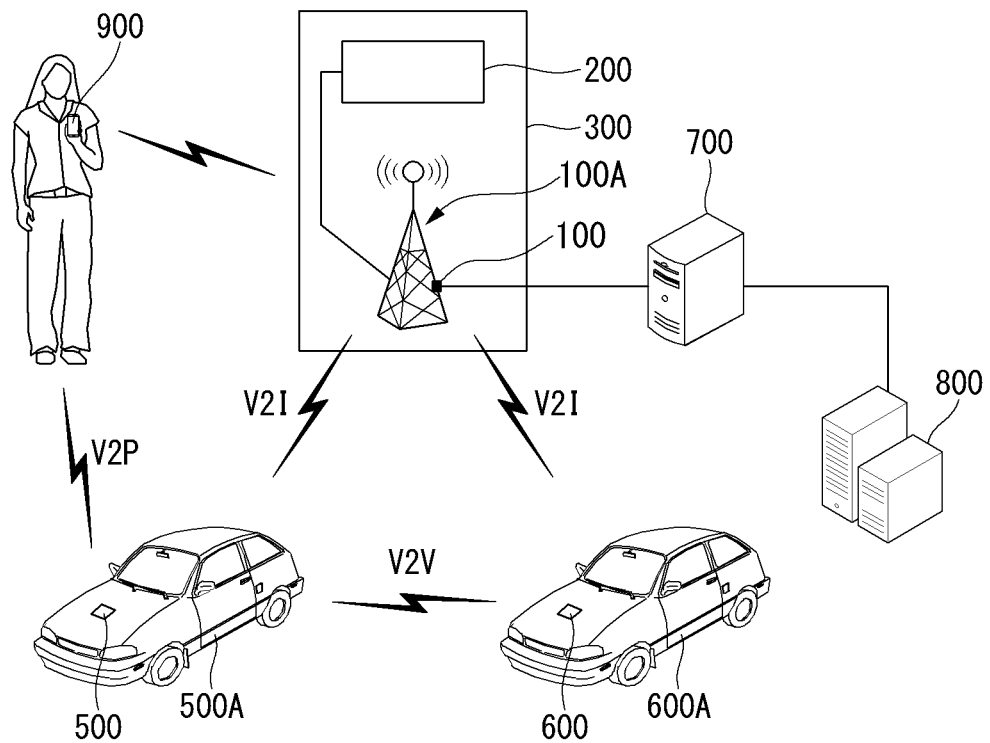
FIG. 1 is a schematic diagram illustrating a cooperative intelligent transport system (C-ITS) that may employ a driving negotiation method according to an example embodiment of the present invention.

Example embodiments of the present invention are disclosed herein. However, specific structural and functional details disclosed herein are merely representative for purposes of describing example embodiments of the present invention, and the example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the accompanying drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a" and "an" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system will be described with regard to a driving negotiation apparatus to which example embodiments of the present invention are applied. The communication system may be a fourth generation (4G) communication system (e.g., a Long-Term Evolution (LTE) communication system or an LTE-advanced (LTE-A) communication system), a fifth generation (5G) communication system (e.g., a new radio (NR) communication system), etc. The 4G communication system may support communication in a frequency band of less than 6 GHz, and the 5G communication system may support communication in a frequency band of 6 GHz or more as well as the frequency band of less than 6 GHz. The communication system to which example embodiments of the present invention are applied is not limited to the following description, and the example embodiments of the present invention may be applied to various communication systems. Here, the term "communication system" may be used with the same meaning as a communication network. The term "LTE" may refer to a "4G communication system," an "LTE communication system," or an "LTE-A communication system," and the term "NR" may refer to a "5G communication system" or an "NR communication system."

A communication technology supported by the communication system may include at least one of code division multiple access (CDMA), wideband CDMA (WCDMA), time-division multiple access (TDMA), frequency-division multiple access (FDMA), orthogonal frequency-division multiplexing (OFDM), filtered OFDM, cyclic prefix (CP)-OFDM, discrete Fourier transform-spread-OFDM (DFT-s-OFDM), orthogonal frequency-division multiple access (OFDMA), single carrier (SC)-FDMA, non-orthogonal multiple access (NOMA), generalized frequency-division multiplexing (GFDM), filter bank multi-carrier (FBMC), universal filtered multi-carrier (UFMC), and space-division multiple access (SDMA).

Hereinafter, exemplary embodiments of the present invention will be described in more detail with reference to the accompanying drawings. In describing the present invention, to facilitate overall understanding of the present invention, like reference numerals denote like elements in the drawings, and the description thereof will not be repeated.

FIG. 1 is a schematic diagram illustrating a cooperative intelligent transport system (C-ITS) that may employ a driving negotiation method according to an example embodiment of the present invention.

Referring to FIG. 1, the C-ITS is an open platform system for improving the stability, continuity, efficiency, and convenience of road traffic by two-way communication and traffic information sharing between ITS stations such as a road side unit (RSU) 100A, a support system 200, vehicle terminals 500 and 600, a C-ITS center 700, an information providing center 800, a mobile terminal 900, etc.

The RSU 100A may collect information from the vehicle terminals 500 and 600 in connection with the support system 200 or the C-ITS center 700 and provide the information. The RSU 100A and the support system 200 are included in road infrastructure 300. The support system 200 may include an unexpected situation sensor, a pedestrian sensor, a road weather information system (RWIS), a signal controller, a wireless access for vehicle environment (WAVE) toll collection device, etc.

Also, the RSU 100A may collect vehicle locations, relative information, etc. from the vehicle terminals 500 and 600 through vehicle to infrastructure (V2I) communication and provide relevant information, such as traffic, an unexpected situation, a signal, and pedestrians, certificate information, global positioning system (GPS) information, etc. to the vehicle terminals 500 and 600.

The first vehicle terminal 500 installed in a first vehicle 500A may share vehicle information through vehicle to vehicle (V2V) communication with the second vehicle terminal 600 installed in a second vehicle 600A. The first vehicle 500A may be an autonomous vehicle or cooperative vehicle, and the second vehicle 600A may be a normal vehicle. Also, the first vehicle terminal 500 may perform two-way wireless communication or vehicle to pedestrian (V2P) communication with the mobile terminal 900 carried by a pedestrian or user directly or through the RSU 100A.

The C-ITS center 700 may be connected to the RSU 100A or the driving negotiation apparatus 100 through a network, such as an optical communication network, and may provide traffic information, GPS information, etc. obtained from the information providing center 800 to the RSU 100A or the driving negotiation apparatus 100. The C-ITS center 700 or the information providing center 800 may include at least one server or computing device that is connected to at least one network.

In this embodiment, the driving negotiation apparatus 100 may be combined with the RSU 100A or installed as at least a partial configuration of the RSU 100A. In another example of implementation, the driving negotiation apparatus 100 may be installed in another infrastructure device including a wireless communication module and a processor or installed in a road infrastructure support system. For convenience of description, the driving negotiation apparatus 100 will be described as a device that is combined with the RSU 100A or installed as at least a partial configuration of the RSU 100A to implement a driving negotiation method to be described below.

The driving negotiation apparatus 100 provides a driving negotiation message or a driving cooperation message and a driving negotiation or cooperation process to vehicles so that the vehicles can ensure stability against a blind spot, an unexpected situation, etc. and effectively cope with the blind spot, the unexpected situation, etc. and autonomous vehicles can make a rapid judgment and ensure stability in various driving environments or driving spaces such as an uncontrolled intersection, a roundabout, an overpass, and road merging. A message set and the like of driving negotiation messages or cooperative messages will be described in detail below.

Figure 2:
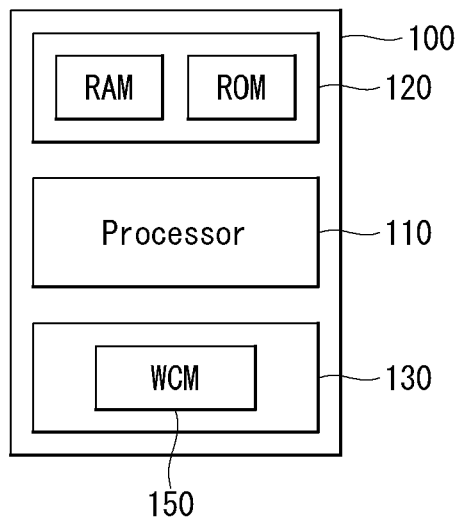
FIG. 2 is a block diagram illustrating a major configuration of a driving negotiation apparatus that performs the driving negotiation method of FIG. 1.

FIG. 2 is a block diagram illustrating a major configuration of a driving negotiation apparatus that performs the driving negotiation method of FIG. 1.

Referring to FIG. 2, the driving negotiation apparatus 100 may include at least one processor 110, a memory 120, and a transceiver 130 that is connected to a network to perform communication. Also, the driving negotiation apparatus 100 may further include an input interface device, an output interface device, a storage device, etc. The components included in the driving negotiation apparatus 100 may be connected through a bus to communicate with each other.

The processor 110 may execute a program command stored in at least one of the memory 120 and a storage device. The processor 110 may be a central processing unit (CPU), a graphics processing unit (GPU), or a dedicated processor for performing methods according to example embodiments of the present invention. Each of the memory 120 and the storage device may be at least one of a volatile storage medium and a non-volatile storage medium. For example, the memory 120 may be at least one of a read-only memory (ROM) and a random access memory (RAM).

The transceiver 130 may include a wireless communication module (WCM) 150. The WCM 150 may include a communication subsystem that supports a wireless short-range communication network such as 5.8 GHz or 5.9 Ghz-band dedicated short-range communication (DSRC), Institute of Electrical and Electronics Engineers (IEEE) 802.11, Wi-Fi, etc.

For wireless communication with a vehicle terminal (on-board equipment (OBE) or an on-board unit (OBU)), the communication subsystem may include elements related to the initialization kernel, the transmission kernel, and the broadcast kernel of the application layer and may comply with a preset operation procedure. Also, the communication subsystem is an ITS or C-ITS communication system and may include layer 7 (L7) application layer of the system, that is, an application layer structure, kernel elements, and an administrator.

Also, the WCM 150 may perform two-way radio frequency (RF) communication with a human machine interface (HMI) connected to the vehicle terminal or antenna of the OBE. The HMI may be connected to an in-vehicle computer that is connected to the OBE equipped with the antenna through an in-vehicle network. The WCM 150 may receive vehicle location, speed, orientation, and acceleration messages at intervals of 100 ms to 300 ms within a range of 300 M.

The above-described driving negotiation apparatus 100 may be included in a communication system including a plurality of base stations or a plurality of terminals and may operate as one base station or RSU. When operating as one base station or RSU, the driving negotiation apparatus 100 may be referred to as NodeB (NB), evolved NodeB (eNB), advanced base station (ABS), high-reliability base station (HR-BS), base transceiver station (BTS), radio base station, radio transceiver, access point, access node, radio access station (RAS), mobile multihop relay-base station (MMR-BS), relay station (RS), advanced relay station (ARS), high-reliability relay station (HR-RS), home NodeB (HNB), home eNodeB (HeNB), RSU, radio remote head (RRH), transmission point (TP), transmission and reception point (TRP), etc.

Also, the driving negotiation apparatus 100 may be connected to a support system, a vehicle terminal, a mobile terminal, etc. through a network to perform communication. Each of the vehicle terminal and mobile terminal may be referred to as user equipment (UE), terminal equipment (TE), advanced mobile station (AMS), high-reliability mobile station (HR-MS), terminal, access terminal, mobile terminal, station, subscriber station, mobile station, portable subscriber station, node, device, OBU, etc.

The driving negotiation apparatus 100 may be disposed at regular intervals along a road. For example, the driving negotiation apparatus 100 or the WCM 150 may be installed in road-side equipment (RSE) or an RSU. This plurality of driving negotiation apparatuses may operate in different frequency bands or the same frequency band. The plurality of driving negotiation apparatuses may be connected to each other through an ideal backhaul link or non-ideal backhaul link and connected to a core network through the ideal backhaul link or non-ideal backhaul link and may exchange information with each other through the ideal backhaul link or non-ideal backhaul link.

The above-described driving negotiation apparatuses may share driving states, driving plans, etc. of vehicles through base safety messages (BSMs) mainly used in V2V communication, probe vehicle data (PVD) mainly used in V2I communication, etc. In this case, the driving negotiation apparatuses may support an autonomous vehicle through a negotiation message set for driving negotiations so that the autonomous vehicle may actively negotiate with another vehicle. In particular, the driving negotiation apparatuses may support the negotiation message set supporting various situations requiring driving negotiations, for example, a request for a speed reduction of another vehicle required for entering a confluence, and provide a message identification method for responding to a negotiation request message and the like. Such a negotiation message set will be described in detail below.

For example, the processor 110 of the driving negotiation apparatus 100 may receive a cooperative request message CooperativeRequestMsg from a first vehicle, generate a cooperative relay message obtained by adding a type code of additional information required for a negotiation to the cooperative request message, generate a relevant message associated with a message type of the cooperative request message according to the message type, broadcast the cooperative relay message and the relevant message to surrounding vehicles, receive a cooperative relay message and/or a cooperative response message CooperativeResponseMsg corresponding to the relevant message from each of at least one second vehicle among the surrounding vehicles, and transmit a message indicating that a negotiation is possible or impossible to the first vehicle.

The additional information may include information related to vehicle speed change, lane change, lane joining, collision warning, collision avoidance, intersection warning, road condition warning for ice and the like, an overpass warning, or toll collection.

Figure 3:
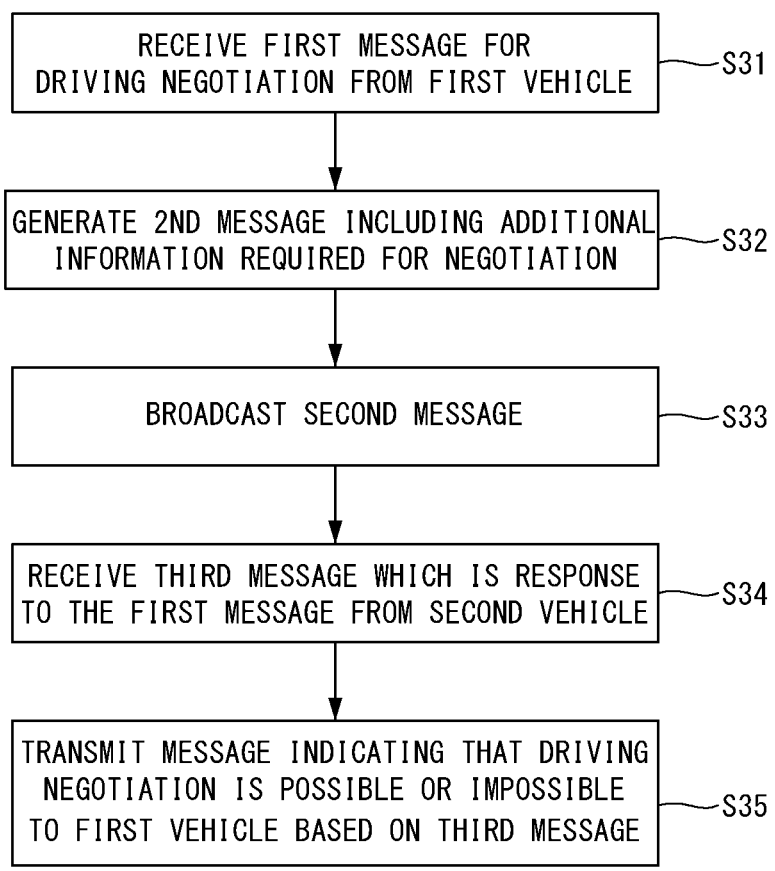
FIG. 3 is a flowchart illustrating an operation principle according to an example embodiment of a driving negotiation method that may be implemented by the driving negotiation apparatus of FIG. 2.
Figure 4:
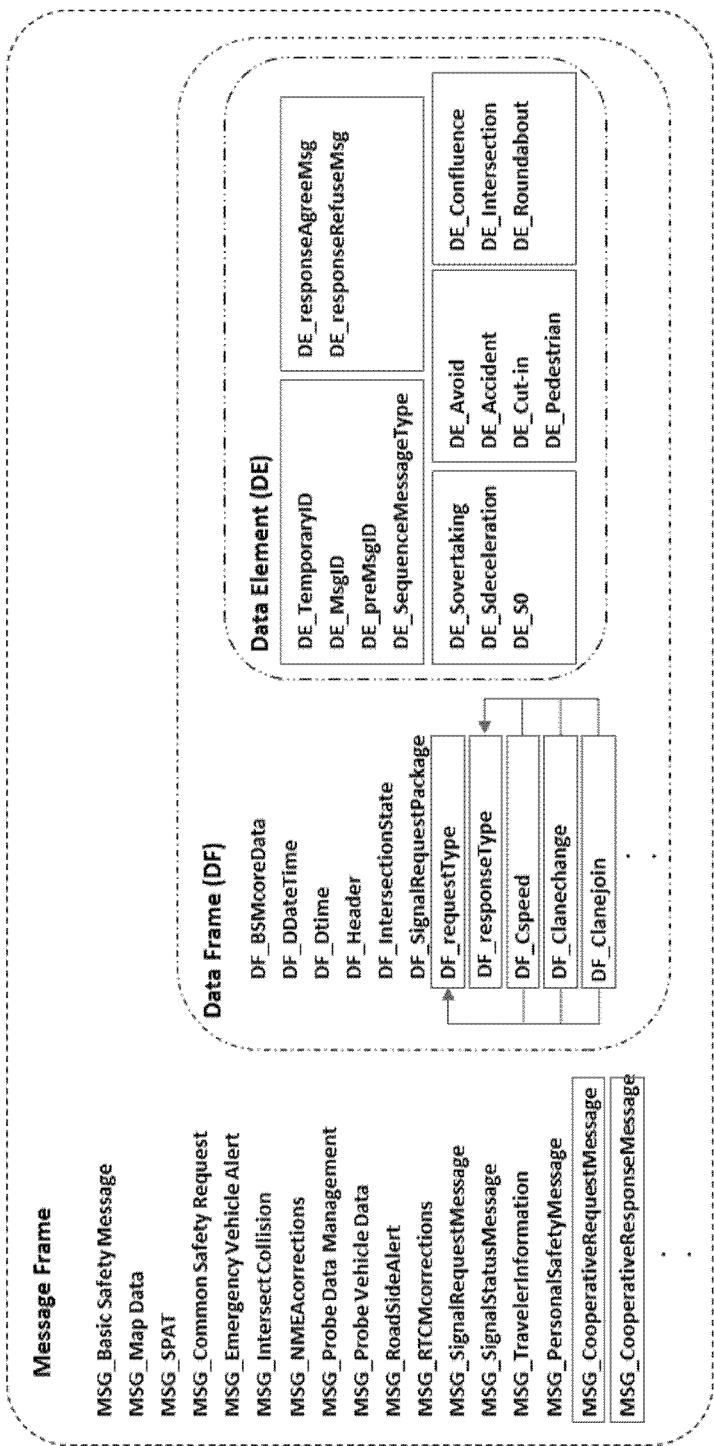
FIG. 4 is a diagram illustrating message frames that may be employed in the driving negotiation method of FIG. 3.

FIG. 3 is a flowchart illustrating an operation principle according to an example embodiment of a driving negotiation method that may be implemented by the driving negotiation apparatus of FIG. 2. FIG. 4 is a diagram illustrating message frames that may be employed in the driving negotiation method of FIG. 3.

In this example embodiment, the driving negotiation apparatus may be combined with a RSU, installed as at least a partial function part of an RSU, or installed as at least a partial configuration of an RSU.

Referring to FIGS. 3 and 4, in the driving negotiation method, the driving negotiation apparatus or the processor of the driving negotiation apparatus may receive a first message for a driving negotiation from a first vehicle (S31). The first message may include a cooperative request message CooperativeRequestMsg.

Subsequently, a second message including additional information required for the negotiation may be generated (S32). The second message may be referred to as a negotiation replay message or the like. In this operation, a driving negotiation apparatus receiving the first message may generate the second message by adding a type code of additional information required for the negotiation according to a driving cooperation type intended for driving cooperation or driving negotiation by a vehicle terminal of the first vehicle.

Also, the driving negotiation apparatus may generate a relevant message associated with a message type of the first message according to the message type. The relevant message is a message different from the second message and may be any one of preset cooperation-related messages.

Alternatively, in a modification form of this example embodiment, the second message and the relevant message may not be separately generated but may be generated as one relay message, and the relay message may be referred to as another second message. Then, the driving negotiation apparatus broadcasts the second message (S33). In this operation, a cooperative relay message including the type code of additional information required for the negotiation and the relevant message may be broadcast to surrounding vehicles. Meanwhile, when the generation of the second message in the previous operation S32 is omitted or the previous operation S32 is processed to generate a second message substantially the same as the first message, this operation S33 may be implemented by immediately broadcasting the first message or the cooperative request message to the surrounding vehicles.

Subsequently, the driving negotiation apparatus may receive a third message, which is a response to the first message or the second message, from at least one second vehicle among the surrounding vehicles (S34). The third message may include a cooperative response message CooperativeResponseMsg. This operation S34 may include receiving a cooperative response message from at least one second vehicle among the surrounding vehicles.

The cooperative request message or the cooperative response message may include data frames (DFs) about vehicle speed, lane changes, and lane joining.

A first DF about vehicle speed may be represented as DF_Cspeed and may include first data elements (DEs) about overtaking, deceleration, and stopping as a negotiation message information about a speed adjustment plan. The first DEs may be represented as DE_Sovertaking, DE_Sdeceleration, DE_C0, DE_Sstop, etc.

A second DF about lane changes may be represented as DF_Clanechange and may include second DEs about avoidance, accidents, cut-ins, and pedestrians as negotiation message information about a lane change plan. The second DEs may be represented as DE_Avoid, DE_Accident, DE_Cut-in, DE_Pedestrian, etc.

A third DF about lane joining may be represented as DF_Clanejoin and may include third DEs about confluences, intersections, and roundabouts as a negotiation message for a joining plan. The third DEs may be represented as DE_Confluence, DE_Intersection, DE_Roundabout, etc.

Also, the cooperative request message or the cooperative response message may include DEs about a timestamp, a vehicle identifier (ID) (or a temporary ID), a message ID UniqueMSG_ID, messageid, or MsgID, a previous message ID previousmessageid or preMsgID, and message information infoMsg.

The message ID is a current driving negotiation session identification value and may be used for defining a process from driving negotiation request to a response as one session. The message information may include a message list or a message type sequence required for negotiation information and may be transmitted in a null state from the first vehicle to the driving negotiation apparatus during an initial driving negotiation.

The cooperative response message may include a data field about a response type. The response type may include a response value for a negotiation of the second vehicle and information required for the negotiation. The data field may include DEs about a message ID and the previous message ID of the first vehicle. Here, the response value for the negotiation may include DEs about agreement or refusal.

Subsequently, the driving negotiation apparatus may transmit a message indicating that the driving negotiation is possible or impossible to the first vehicle on the basis of the third message (S35). The message indicating that the driving negotiation is possible or impossible may be referred to as a fourth message. This operation S35 may include transmitting a message indicating that the driving negotiation is possible or impossible to the first vehicle on the basis of the cooperative response message in a broadcasting form.

When all of cooperative response messages from the at least one second vehicle include DEs indicating that the driving negotiation is impossible, the driving negotiation apparatus may operate to end a current driving negotiation session.

After transmitting the message indicating that the driving negotiation is possible or impossible to the first vehicle, the driving negotiation apparatus may receive a message for renegotiation or another cooperative request message in which an identification value of the current driving negotiation session is set to an identification value of a previous driving negotiation session from the first vehicle. The other cooperative request message may be referred to as a second cooperative request message. When the second cooperative request message is received from the first vehicle, the driving negotiation apparatus may determine that the currently requested driving negotiation session is a renegotiation for the previous driving negotiation session on the basis of message information of the corresponding message. When the second cooperative request message is received from the second vehicle, the driving negotiation apparatus may determine that the second cooperative request message is a cooperative request message for new driving negotiation.

When two or more second cooperative request messages compete, the driving cooperative device may select or identify any one of the cooperative request messages in a preset order of priority. To this end, the driving negotiation apparatus may use message information of the corresponding message.

According to the above-described configuration, for example, when a message type of the negotiation request message is lane joining, the driving negotiation apparatus or the processor thereof may generate an intersection collision alert message (ICA) as a cooperative relay message and include a preset type code in the message information. The message type code may be a message ID, for example, DE_DSRC_MessageID, defined in documents such as Society of Automotive Engineers (SAE) J2735.

With regard to several messages other than a cooperative request message MSG_CooperativeRequestMessage and a cooperative response message MSG_CooperativeResponseMessage, for example, a basic safety message (BSM) and messages about map data MSG_Map data and signal phase and timing MSG_SPAT, among the message frames shown in FIG. 4, the definition of the SAE J2735 message set may be referred to.

Likewise, with regard to several pieces of data other than request type data DF_requestType, response type data DF_responseType, cooperative speed data DF_Cspeed, cooperative lane change data DF_Clanechange, cooperative lane joining data DF_Clanejoin, for example, BSM core data DF_BSMcoreData, date and time data DF_DDateTime, intersection state data DF_IntersectionState, and signal request package data DF_SignalRequestPackage, among the DFs shown in FIG. 4, the definition of the SAE J2735 message set may be referred to.

In the driving negotiation method according to this example embodiment, a message set for driving negotiations is defined by adding a vehicle ID element DE_TemporaryID, a message ID element DE_MsgID, a previous message ID element DEpreMsgID, a response agreement message element, etc. to DEs of the message set.

An inter-vehicle driving negotiation processor according to this example embodiment will be described below in detail with reference to FIGS. 5 to 9.

FIGS. 5 to 9 are example diagrams schematically illustrating main operation principles of the driving negotiation method of FIG. 3.

Figure 5:
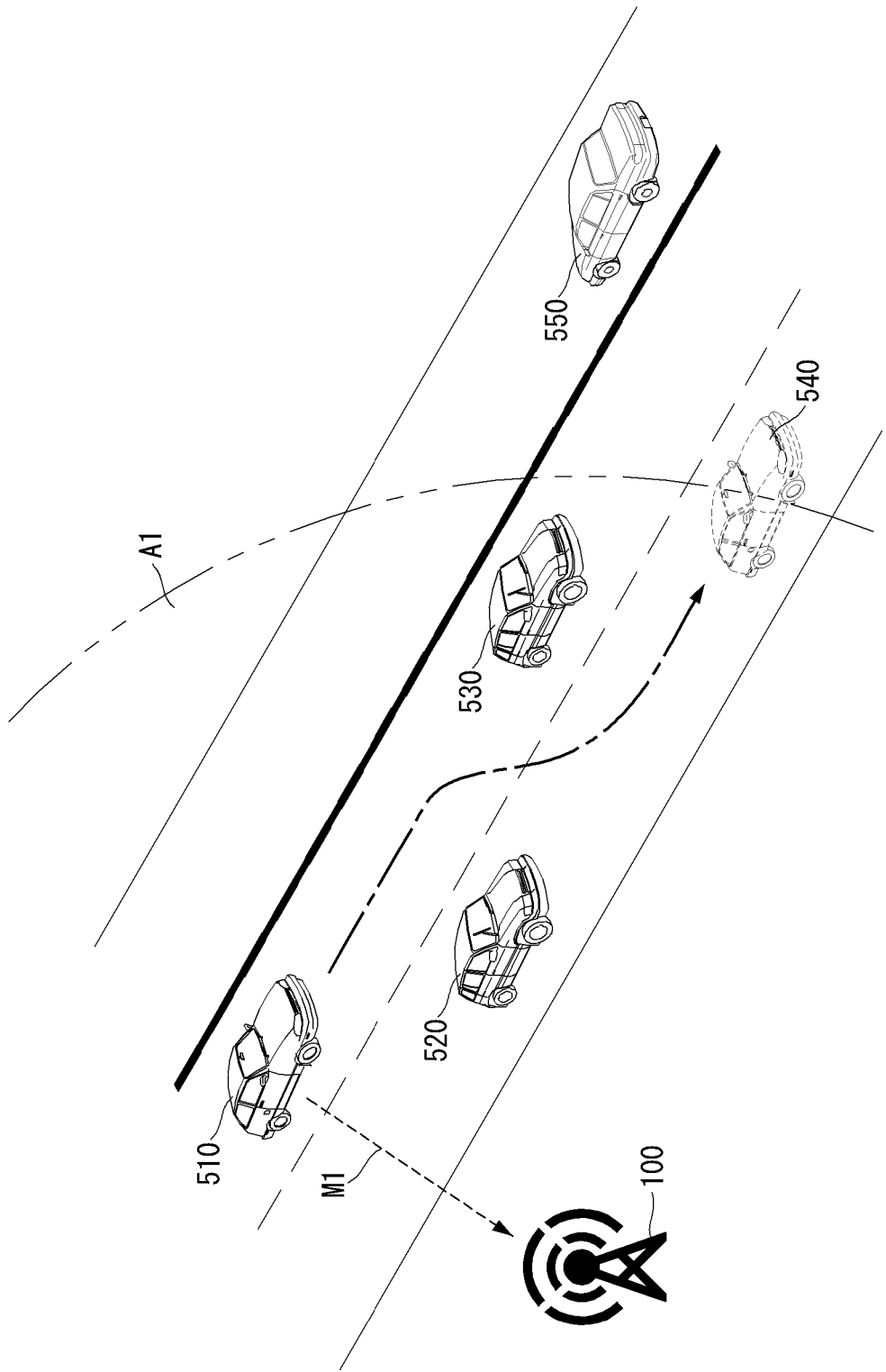
FIGS. 5 to 9 are example diagrams schematically illustrating main operation principles of the driving negotiation method of FIG. 3.

Referring to FIG. 5, in an inter-vehicle driving negotiation process, a first cooperative vehicle 510 or a vehicle terminal of the first cooperative vehicle first transmits a cooperative request message M1 for a driving negotiation to a driving negotiation apparatus 100 combined with an RSU. The first cooperative vehicle 510, a second cooperative vehicle 520, and a third cooperative vehicle 530 are present in a communication coverage A1 of the RSU, and other vehicles 540 and 550 are present outside the communication coverage A1. At least one of the first cooperative vehicle 510, the second cooperative vehicle 520, and the third cooperative vehicle 530 may be an autonomous vehicle that may cooperate with other vehicles.

In other words, the vehicle terminal of the first cooperative vehicle 510 transmits a cooperative request message for the driving negotiation when transmitting ITS or C-ITS data. The cooperative request message may include timestamp, vehicle ID, message ID, and previous message ID values as basic DEs. The message ID MsgID is an identification value of a current driving negotiation session and may be used for defining a process from driving negotiation request to response. Also, the previous message ID preMsgID may be an identification value of a previous driving negotiation session.

During an initial driving negotiation, a message information DF CinfoMsg of a cooperative request message may be transmitted in a null state from the first cooperative vehicle 510 to the RSU or the driving negotiation apparatus 100.

The cooperative request message may also transmit information required for the negotiation through a specific DF, for example, a request type DF DF_requestType. For example, the cooperative request message may additionally include message information DF CinfoMsg including a message list required for negotiation information. The message information DF includes a sequence of message types, and message types may include forward collision warning (FCW), emergency electronic brake light (EEBL), signal phase and timing (SPAT), traveler information message (TIM), roadside alert (RSA), PVD, electronic toll collection system (ETCS), etc.

Also, the cooperative request message may include a first data element DE_Cspeed including negotiation message information about a speed adjustment plan, such as overtaking, deceleration, and stopping, a second data element DE_Clanechang including negotiation message information about a lane change plan in which avoidance, accidents, obstacles, cut-ins, pedestrians, etc. are taken into consideration, a third data element including negotiation message information about a joining plan at an intersection, a roundabout, etc.

Figure 6:
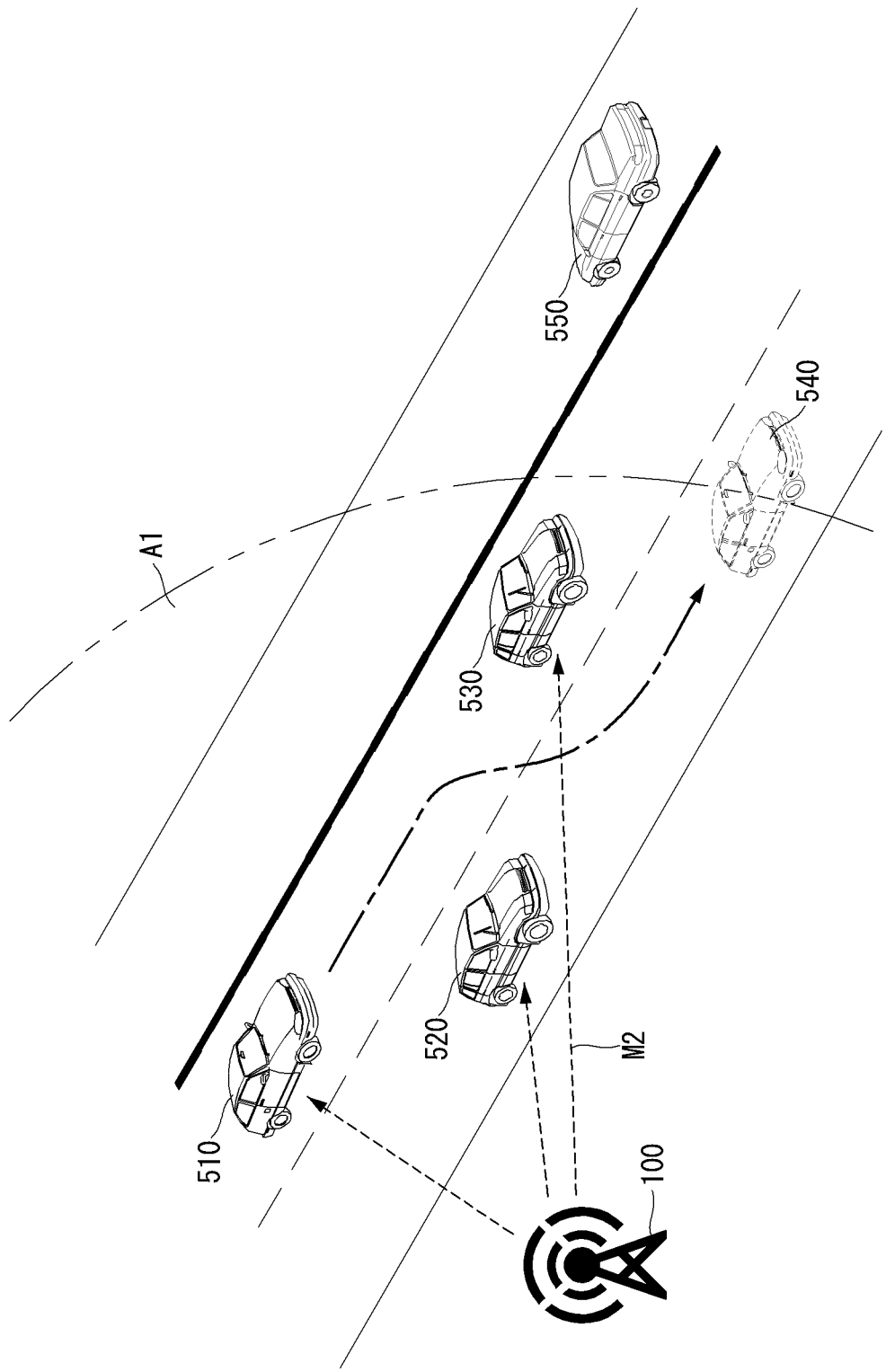

Referring to FIG. 6, in the inter-vehicle driving negotiation process, the driving negotiation apparatus 100 combined with an RSU generates a second message M2 obtained by adding a type code of additional information required for the negotiation to the cooperative request message of the first cooperative vehicle 510 and transmits the second message M2 together with the cooperative request message to the at least one of the second and third cooperative vehicles 520 and 530 in a broadcasting form. The second message M2 may be referred to as a cooperative relay message, and the cooperative request message may be referred to as a first message.

In other words, the RSU or the driving negotiation apparatus 100 receiving the first message may identify a request type or a message type of the cooperative request message, generate a relevant message associated with the message type, and broadcast the relevant message together with the cooperative request message or the cooperative relay message.

The driving negotiation apparatus 100 may determine additional information required for the negotiation according to the request type or the message type of the cooperative request message. With regard to the additional information, a message set provided in SAE J2735 may be referred to. For example, the additional information may include information related to vehicle speed change, lane change, lane joining, collision warning, collision avoidance, intersection warning, road condition warning for ice and the like, overpass warning, or toll collection.

After generating the relevant message about the additional information, the driving negotiation apparatus 100 may broadcast the relevant message together with the cooperative relay message obtained by adding the type code of the corresponding message type to the message information DF CinfoMsg of the cooperative request message.

For example, when the request type of a negotiation request message is set to a lane joining data element DE_Clanejoin, the driving negotiation apparatus 100 or the processor may generate an intersection collision alert (ICA) message as a relevant message of the cooperation relay message. Also, the driving negotiation apparatus 100 or the processor may include a preset type code of ICA in the message information DF CinfoMsg of the cooperative relay message. The message type code may be a message ID, for example, DE_DSRC_MessageID, defined in documents such as SAE J2735. Subsequently, the driving negotiation apparatus 100 may broadcast the ICA message together with the cooperative request message.

Figure 7:
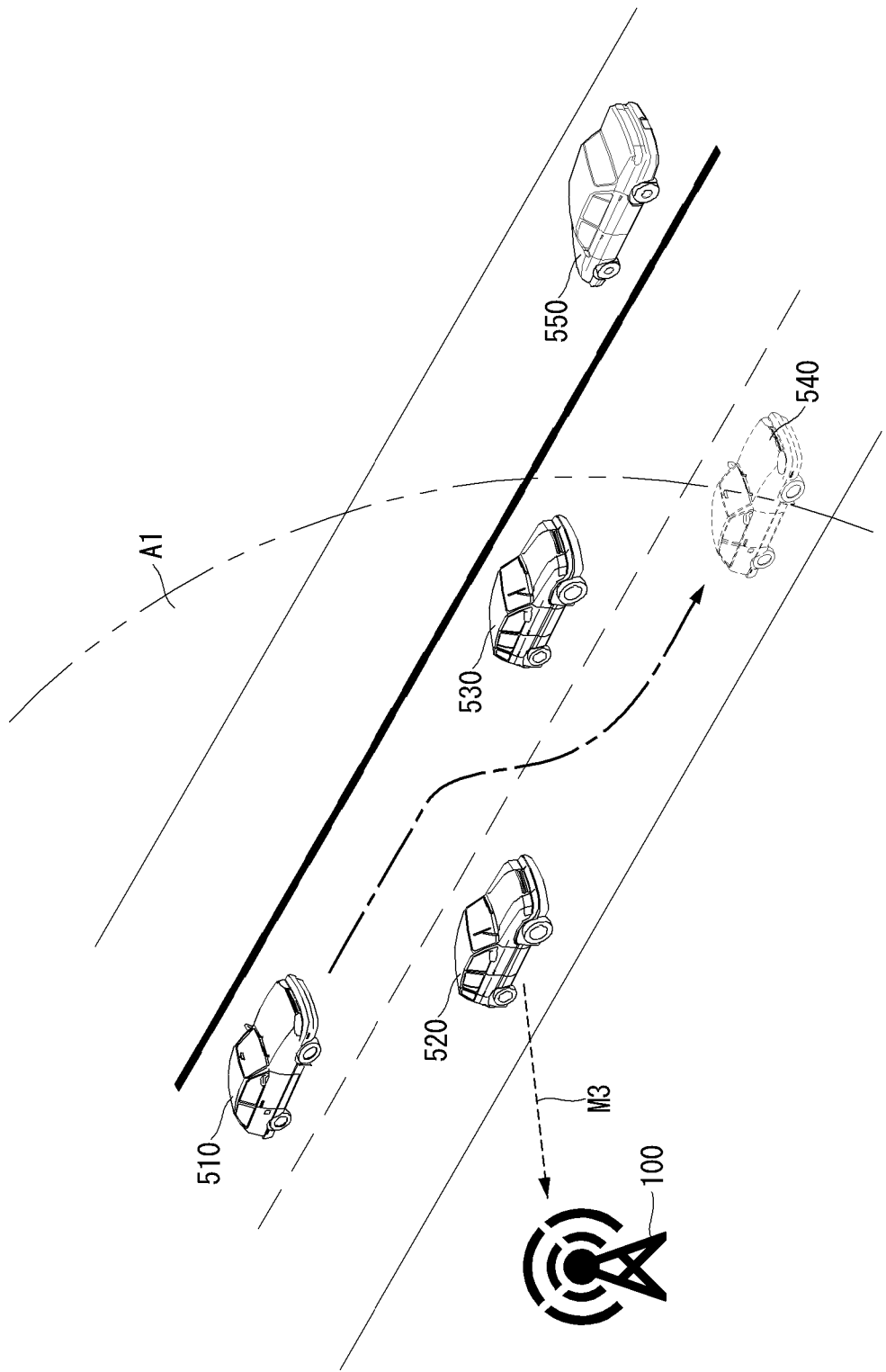

Referring to FIG. 7, in the inter-vehicle driving negotiation process, the driving negotiation apparatus 100 combined with the RSU receives a cooperative response message M3 from the second cooperative vehicle 520. The cooperative response message M3 may be referred to as a third message.

In other words, the second cooperative vehicle 520 among one or more cooperative vehicles receiving the negotiation request message may transmit a cooperative response message including a response value for the negotiation and information required for the negotiation in a response type DF to the driving negotiation apparatus 100.

When transmitting a cooperative response message, a vehicle terminal of the second cooperative vehicle 520 includes the message ID MsgID and the previous message ID preMsgID of the vehicle that has transmitted the negotiation request in DEs. In this case, the driving negotiation apparatus 100 may determine which cooperative request message corresponds to the currently received cooperative response message.

This is helpful in efficiently identifying and relaying a specific cooperative request message and a cooperative response message corresponding thereto when the driving negotiation apparatus 100 processes a plurality of cooperative request messages and a plurality of cooperative response messages in a one-to-many (N) or many (M)-to-N environment.

Figure 8:
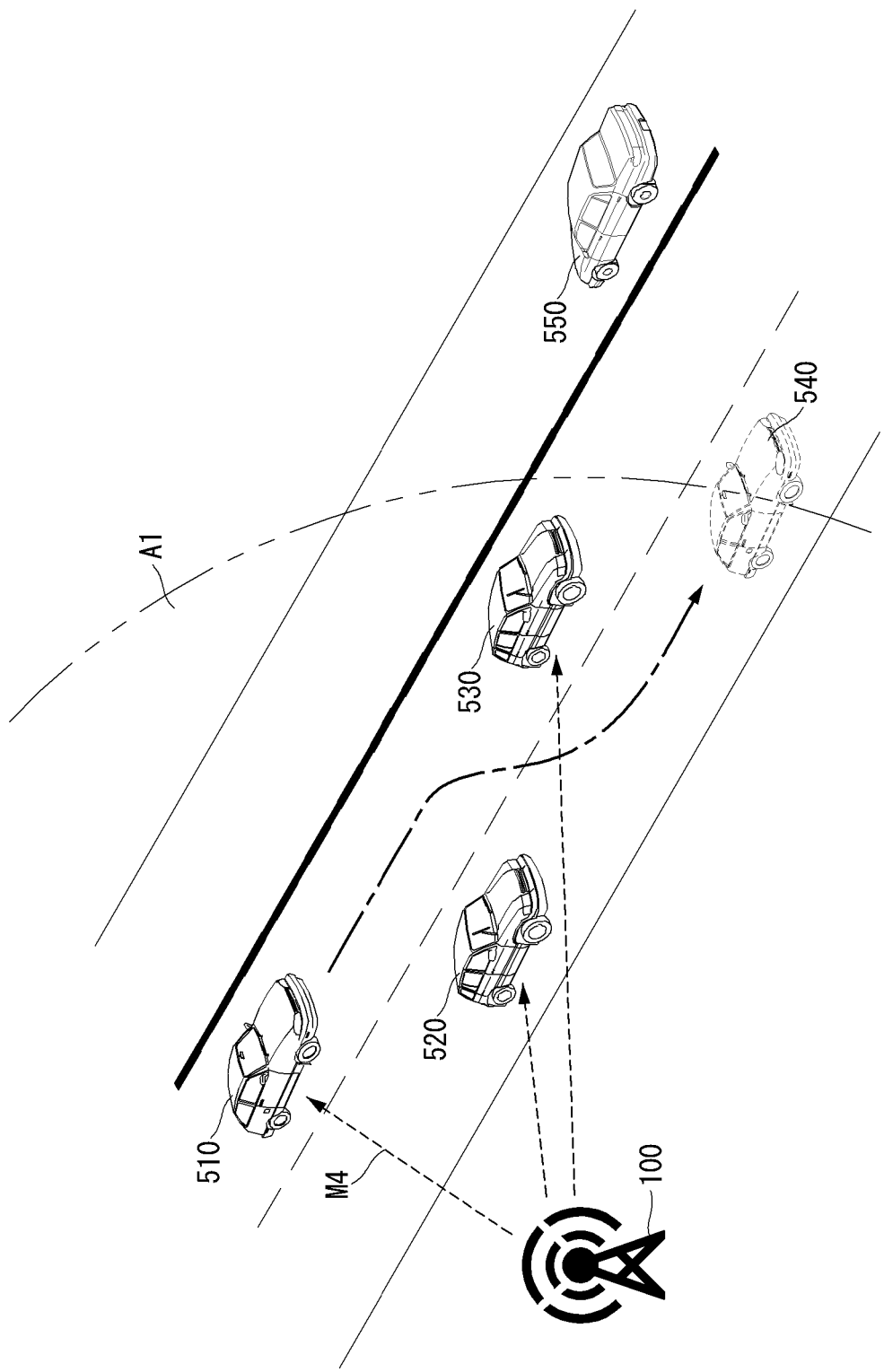

Referring to FIG. 8, in the inter-vehicle driving negotiation process, the driving negotiation apparatus 100 may transmit the received cooperative response message to the first cooperative vehicle 510. The cooperative response message M4 broadcast from the first driving negotiation apparatus 100 to the first cooperative vehicle 510 may correspond to a fourth message or a message indicating that the driving negotiation is possible or impossible. When negotiation is possible, the first cooperative vehicle 510 and the second cooperative vehicle 520 perform driving negotiation through direct communication or communication based on the RSU. When the driving negotiation is completed, each of vehicle negotiation results can be carried out on the basis of the corresponding request type.

On the other hand, when negotiation is impossible, the driving negotiation apparatus 100 may broadcast the corresponding cooperative response message to the first cooperative vehicle 510 and then end the current driving negotiation session.

Figure 9:
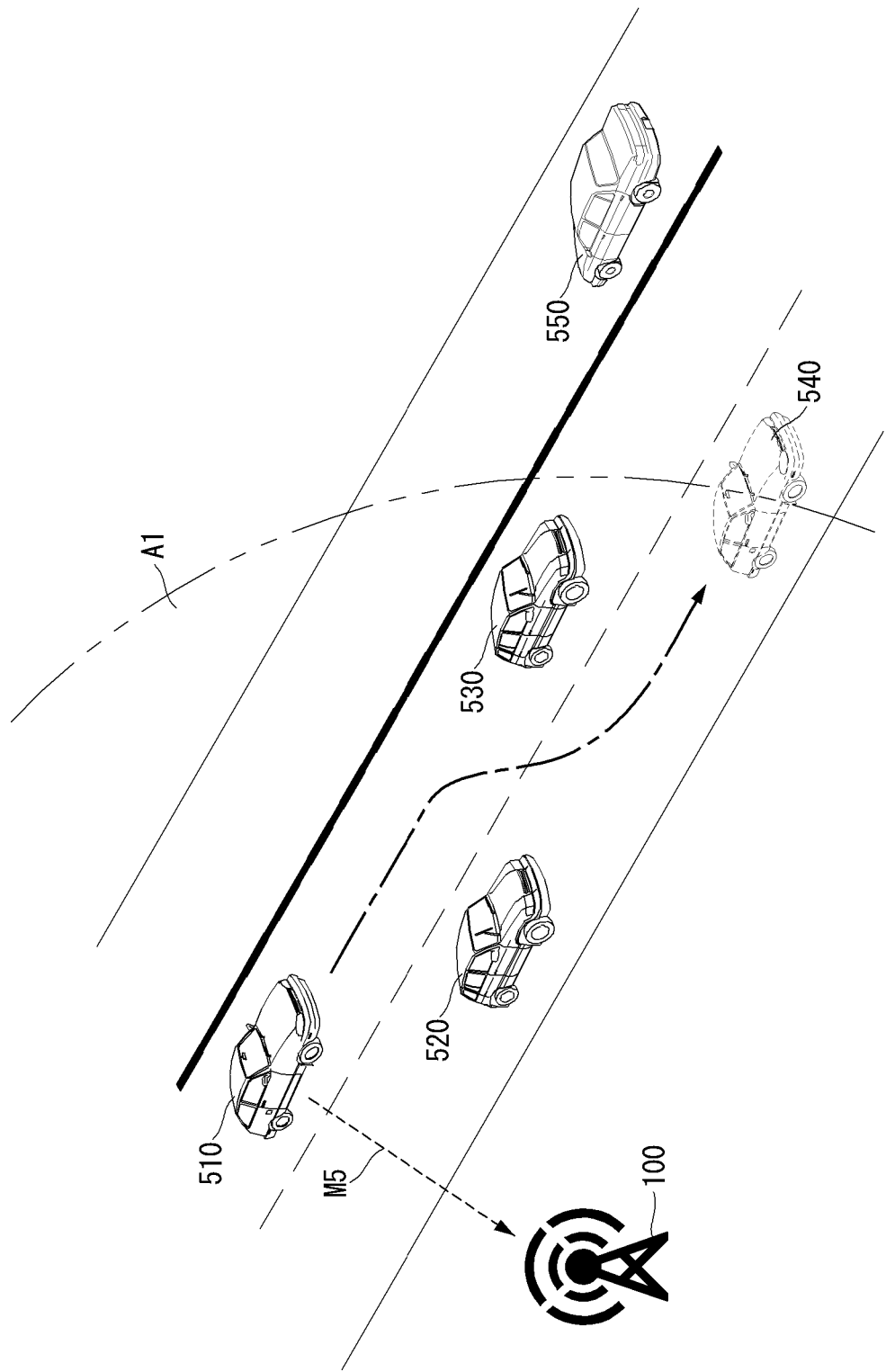

Referring to FIG. 9, in the inter-vehicle driving negotiation process, when a renegotiation is required or additional information for the driving negotiation is required after the driving negotiation session distinguished with the just previous message ID MsgID, the driving negotiation apparatus 100 may repeatedly perform the above-described driving negotiation process in which the messages M1 to M4 are used.

To this end, the driving negotiation apparatus 100 may receive another cooperation request message M5 from the first cooperative vehicle 510. The other cooperative request message M5 may be referred to as a fifth message.

Among DEs in the fifth message, a previous message ID DEpreMsgID may be set to the value of a message ID DE_MsgID of the previous driving negotiation session. Such a setting may be helpful in identifying whether the fifth message received by the driving negotiation apparatus 100 corresponds to a renegotiation for the previous driving negotiation or a new driving negotiation of another cooperative vehicle.

In the driving negotiation method according to this example embodiment, a driving negotiation may be extended for a renegotiation or a request for additional information. This will be described in further detail with reference to FIG. 10.

Figure 10:
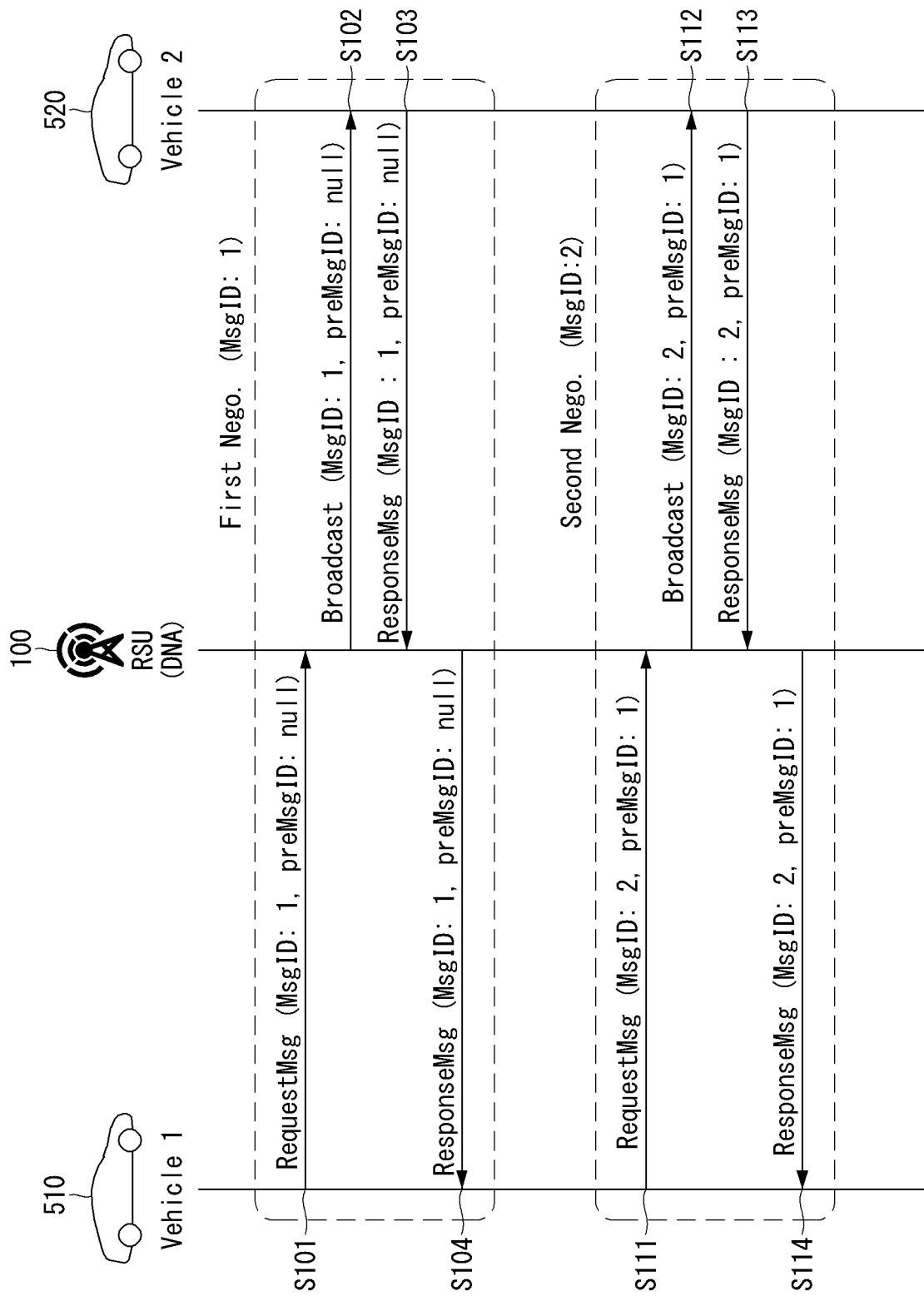
FIG. 10 is a sequence diagram illustrating a modified example of the driving negotiation method of FIG. 3.

FIG. 10 is a sequence diagram illustrating a modified example of the driving negotiation method of FIG. 3.

Referring to FIG. 10, as a first cooperative vehicle, a first vehicle 510 may perform a first negotiation for a driving negotiation and then perform a second negotiation for an additional information request and the like.

More specifically, in the first negotiation, the first vehicle 510 may transmit a cooperative request message requestMsg in which a message ID MsgID and a previous message ID preMsgID are set to 1 and null, respectively, to a driving nego. apparatus (DNA) 100 (S101). The first vehicle 510 may be a first cooperative vehicle or a first autonomous vehicle. The cooperative request message may be referred to as a first message, and the previous message ID preMsgID may be set to null when there is no previous driving negotiation session.

Subsequently, the DNA 100 transmits a cooperative request message or a second message to surrounding vehicles including a second vehicle 520 present in the communication coverage in a broadcasting form (S102). The second vehicle 520 may be a second cooperative vehicle or a second autonomous vehicle.

Then, the second vehicle 520 transmits a cooperative response message ResponseMsg corresponding to the cooperative request message to the DNA 100 (S103). In the cooperative response message Response Msg, a message ID may be set to 1, and a previous message ID may be set to null.

Subsequently, the DNA 100 transmits a fourth message corresponding to the cooperative response message to the first vehicle 510 in a broadcasting form (S104). In the fourth message, a message ID may be set to 1, and a previous message ID may be set to null.

According to a set value of a response agreement message element DE_responseAgreeMsg or a response refusal message element DE_responseRefuseMsg among DEs in the fourth message, the first vehicle 510 may conduct a driving negotiation with the second vehicle 520 on the basis of message information or transmit another cooperative request message for a renegotiation or the extension of the driving negotiation to the DNA 100 without conducting the current driving negotiation session.

When the second negotiation corresponding to a renegotiation or the extension of the driving negotiation is conducted, a vehicle terminal of the first vehicle 510 may designate a message ID for the previous driving negotiation session as a previous message ID preMsgID for the current driving negotiation session.

For example, the vehicle terminal of the first vehicle 510 transmits a cooperative request message RequestMsg, in which a message ID MsgID is set to 1, to the DNA 100 (S111). The cooperative request message may be referred to as a fifth message.

Subsequently, the DNA 100 transmits a sixth message including the fifth message and additional information of the fifth message to the surrounding vehicles including the second vehicle 520 in a broadcasting form (S112).

Then, the second vehicle 520 transmits a cooperative response message ResponseMsg corresponding to the fifth message to the DNA 100 (S113). In this case, in the cooperative response message ResponseMsg, a message ID may be set to 2, and a previous message ID may be set to 1. The cooperative response message may be referred to as a seventh message.

Subsequently, the DNA 100 transmits an eighth message corresponding to the seventh message to the first vehicle 510 in a broadcasting form (S114). In the eighth message, a message ID may be set to 2, and a previous message ID may be set to 1.

According to this example embodiment, it is possible to identify which one of a new driving negotiation session, a renegotiation session, and an additional information request session is a current driving negotiation session through set values of a message ID and a previous message ID.

Figure 11:
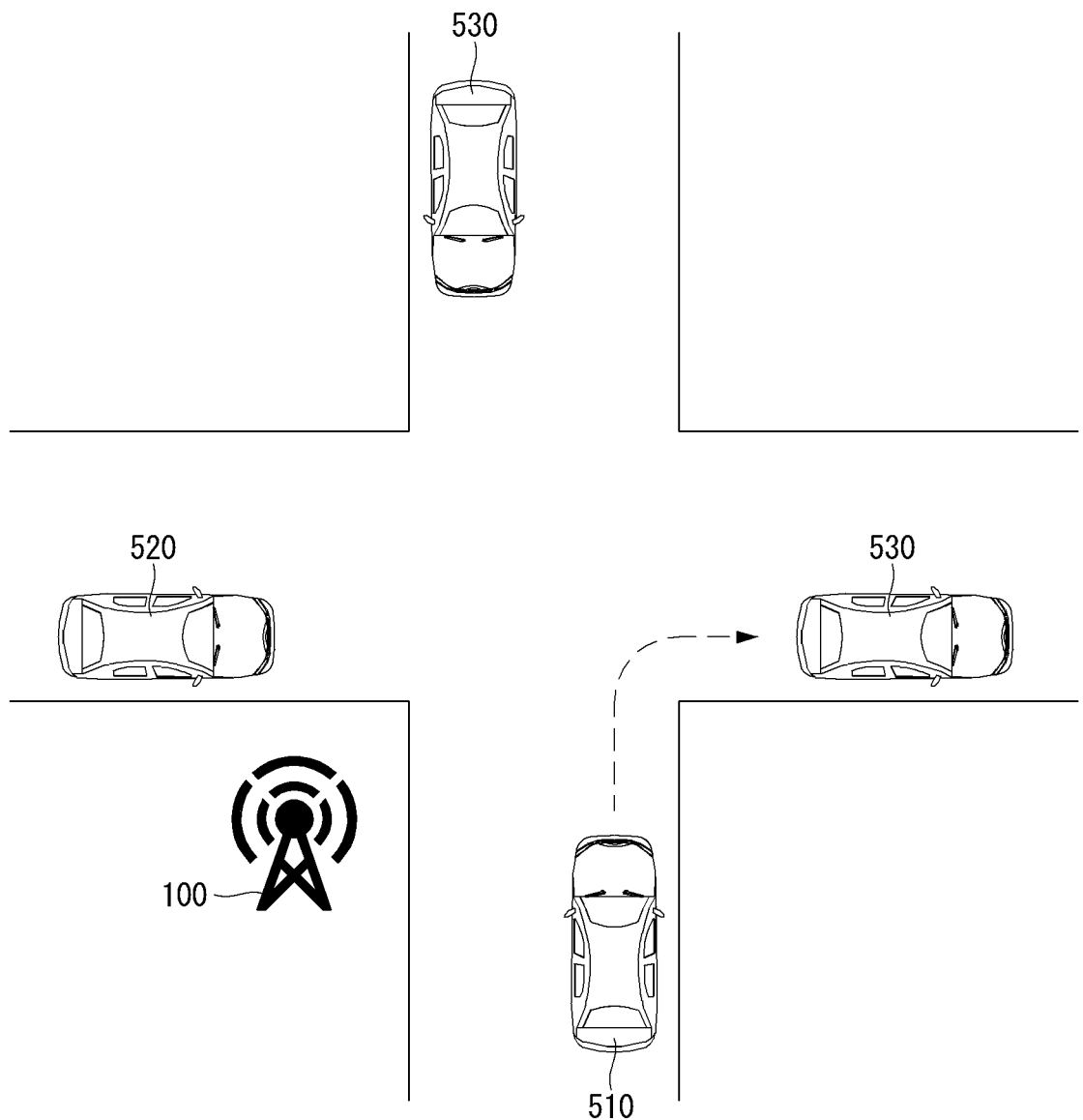
FIG. 11 is an example diagram illustrating a driving process of an autonomous vehicle employing the driving negotiation method of FIG. 3.

FIG. 11 is an example diagram illustrating a driving process of an autonomous vehicle employing the driving negotiation method of FIG. 3.

Referring to FIG. 11, when an autonomous vehicle 510 which is a first cooperative vehicle tries to make a right turn at an intersection, a second vehicle 520 entering the intersection from another road may not be visible, particularly due to buildings around the road. In this case, a driving negotiation may be conducted by transmitting a cooperative request message and receiving a cooperative response message through a driving negotiation apparatus 100. Accordingly, the timing of entering the intersection can be adjusted by negotiating with the second vehicle 520, and it is possible to improve stability against a blind spot, an unexpected situation, etc.

According to the configurations of the above-described example embodiments, it is possible to support a first cooperative vehicle, such as an autonomous vehicle, to actively negotiate with another vehicle about driving. In particular, a RSU including a driving negotiation apparatus or a configuration which performs the function of a driving negotiation apparatus or corresponds to a driving negotiation apparatus can effectively support various situations requiring driving negotiations, for example, a request for a speed reduction of another vehicle required for entering a confluence. In particular, these example embodiments provide a method of identifying a plurality of negotiation response messages for responding to at least one negotiation request message and the like and thus can be effectively used in a C-ITS environment.

According to the present invention, in a next-generation intelligent transport system or a C-ITS in which information can be shared among electronic devices, particularly, vehicles and objects, vehicles actively and effectively share driving negotiation strategies, and thus stability in vehicle driving can be improved.

Also, according to the present invention, in a road environment in which general vehicles without any communication function, autonomous vehicles, etc. coexist, infrastructure devices, such as RSUs, function so that driving negotiation strategies can be shared. Accordingly, it is possible to improve the stability and capability of an autonomous vehicle to cope with blind spots or unexpected situations on the road. In particular, when various driving situations occur in uncontrolled intersections, roundabouts, merging roads, etc., it is possible to help autonomous vehicles make quick judgments and improve driving stability.

Further, according to the present invention, it is possible to improve the driving stability of vehicles, such as autonomous vehicles, by providing the definitions of a message set and a negotiation process for driving negotiations based on V2I communication in a C-ITS environment.

Methods according to example embodiments of the present invention may be implemented in the form of program commands which can be executed by various computing means and recorded on a computer-readable medium. The computer-readable medium may include program commands, data files, data structures, etc. solely or in combination. Program commands recorded on the computer-readable medium may be specially designed and configured for the present invention or well known by and available to those of ordinary skill in the computer software field.

Examples of the computer-readable medium may include a hardware device specially configured to store and execute program commands, such as a ROM, a RAM, a flash memory, and the like. Examples of the program commands may include not only a machine language code generated by a compiler but also a high-level language code that may be executed by a computer by means of an interpreter or the like. The hardware device may be configured to operate as at least one software module for performing operations of the present invention, or vice versa.

While the exemplary embodiments of the present invention have been described above, those of ordinary skill in the art should understand that various changes, substitutions and alterations may be made without departing from the spirit and scope of the present invention as defined by the following claims.

What is claimed is:

1. A driving negotiation apparatus comprising:
 a transceiver configured to include a communication subsystem that supports vehicle to everything (V2X) communication; and
 at least one processor connected to the transceiver,
 wherein the at least one processor receives a cooperative request message (CooperativeRequestMsg) from a first vehicle, generates and broadcasts a cooperative relay message obtained by adding a type code of additional information required for a negotiation to the cooperative request message to surrounding vehicles, receives a cooperative response message (CooperativeResponseMsg) corresponding to the cooperative relay message from at least one second vehicle among the surrounding vehicles, and transmits a message indicating that the negotiation is possible or impossible to the first vehicle on the basis of the cooperative response message, wherein the cooperative request message or the cooperative response message includes data frames (DFs) about vehicle speed, lane changes, and lane joining, wherein the cooperative request message or the cooperative response message includes data elements of a temporary identifier (temporaryID), a message ID (MsgID), a previous message ID (preMsgID), and message information (infoMsg), wherein the message ID (MsgID) is a current driving negotiation session identification value and used in defining a process from driving negotiation request to driving negotiation response as one session, wherein the message information (infoMsg) is a message type sequence (SequenceofMessageType) required for negotiation information, and wherein the cooperative response message includes a data element indicating a response agree message or a response refuse message as a response value for the negotiation which is possible or impossible.

2. The driving negotiation apparatus of claim 1, wherein a first DF about the vehicle speed includes first data elements about overtaking, deceleration, and stopping as negotiation message information about a speed adjustment plan, a second DF about the lane changes includes second data elements about avoidance, accidents, cut-ins, and pedestrians as negotiation message information about a lane change plan, and a third DF about the lane joining includes third data elements about confluences, intersections, and roundabouts as negotiation message information about a joining plan.

3. The driving negotiation apparatus of claim 1, wherein the cooperative request message or the cooperative response message further includes a data element about a timestamp.

4. The driving negotiation apparatus of claim 1, wherein the message information is received in a null state from the first vehicle during an initial driving negotiation.

5. The driving negotiation apparatus of claim 1, wherein, before broadcasting the cooperative relay message to the surrounding vehicles, the at least one processor generates a relevant message associated with a message type of the cooperative request message according to the message type in connection with the additional information, and adds a preset type code of the relevant message to the cooperative relay message, and when broadcasting the cooperative relay message, the at least one processor broadcasts the relevant message together with the cooperative relay message.

6. The driving negotiation apparatus of claim 1, wherein the cooperative response message further includes data elements about a message identifier (ID) and a previous message ID of the first vehicle.

7. The driving negotiation apparatus of claim 6, wherein the transceiver is installed in road side equipment or a road side unit (RSU).

8. The driving negotiation apparatus of claim 1, wherein the message indicating that the negotiation is possible or impossible is transmitted to the first vehicle in a form of broadcasting.

9. The driving negotiation apparatus of claim 1, wherein, after transmitting the message indicating that the negotiation is possible or impossible to the first vehicle, the at least one processor further receives a message for a renegotiation or another cooperative request message in which an identification value of a current driving negotiation session is an identification value of a previous driving negotiation session from the first vehicle.

10. A driving negotiation method comprising:
receiving a cooperative request message (CooperativeRequestMsg) from a first vehicle;
generating a cooperative relay message obtained by adding a type code of additional information required for a negotiation to the cooperative request message;
broadcasting the cooperative relay message to surrounding vehicles;
receiving a cooperative response message (CooperativeResponseMsg) corresponding to the cooperative relay message from at least one second vehicle among the surrounding vehicles; and
transmitting a message indicating that the negotiation is possible or impossible to the first vehicle on the basis of the cooperative response message, wherein the cooperative request message or the cooperative response message includes data frames (DFs) about vehicle speed, lane changes, and lane joining, wherein the cooperative request message or the cooperative response message includes data elements of a temporary identifier (temporaryID), a message ID (MsgID), a previous message ID (preMsgID), and message information (infoMsg), wherein the message ID (MsgID) is a current driving negotiation session identification value and used in defining a process from driving negotiation request to driving negotiation response as one session, wherein the message information (infoMsg) is a message type sequence (SequenceofMessageType) required for negotiation information, and wherein the cooperative response message includes a data element indicating a response agree message or a response refuse message as a response value for the negotiation which is possible or impossible.

11. The driving negotiation method of claim 10, wherein a first DF about the vehicle speed includes first data elements about overtaking, deceleration, and stopping as negotiation message information about a speed adjustment plan, a second DF about the lane changes includes second data elements about avoidance, accidents, cut-ins, and pedestrians as negotiation message information about a lane change plan, and a third DF about the lane joining includes third data elements about confluences, intersections, and roundabouts as negotiation message information about a joining plan.

12. The driving negotiation method of claim 10, wherein the cooperative request message or the cooperative response message further includes a data element about a timestamp.

13. The driving negotiation method of claim 10, wherein the message information is received in a null state from the first vehicle during an initial driving negotiation.

14. The driving negotiation method of claim 10, further comprising, before the broadcasting of the cooperative relay message to the surrounding vehicles, generating a relevant message associated with a message type of the cooperative request message according to the message type in connection with the additional information, wherein the broadcasting of the cooperative relay message comprises broadcasting the relevant message together with the cooperative relay message.

15. The driving negotiation method of claim 10, wherein the cooperative response message further includes data elements about a message identifier (ID) and a previous message ID of the first vehicle.

16. The driving negotiation method of claim 10, wherein the message indicating that the negotiation is possible or impossible is transmitted to the first vehicle in a form of broadcasting.

17. The driving negotiation method of claim 10, further comprising, after transmitting of the message indicating that the negotiation is possible or impossible to the first vehicle, receiving a message for a renegotiation or another cooperative request message in which an identification value of a current driving negotiation session is an identification value of a previous driving negotiation session from the first vehicle.

* * * * *